United States Patent [19]

Fries

[11] Patent Number: 4,903,191

[45] Date of Patent: Feb. 20, 1990

[54] CENTRIFUGE CONTROL SYSTEM HAVING DUAL PROCESSORS

[75] Inventor: Gerald E. Fries, Bear, Del.

[73] Assignee: E. I. Du Pont de Nemours and Company, Wilmington, Del.

[21] Appl. No.: 137,097

[22] Filed: Dec. 23, 1987

[51] Int. Cl.⁴ .............................................. G06F 11/16
[52] U.S. Cl. .................................. 364/132; 364/133; 364/187
[58] Field of Search ............... 364/132, 133, 134, 186, 364/187; 371/9, 68, 14

[56] References Cited

U.S. PATENT DOCUMENTS

| 3,262,040 | 7/1966 | Jackson | 318/327 |
| 4,133,642 | 1/1979 | Nosaka et al. | 422/67 |
| 4,319,320 | 3/1982 | Sato et al. | 364/165 |
| 4,367,043 | 1/1983 | Sweet et al. | 356/338 |
| 4,400,792 | 8/1983 | Strelow | 371/68 |
| 4,494,207 | 1/1985 | Chang et al. | 364/494 |
| 4,494,208 | 1/1985 | Chang | 364/494 |
| 4,631,722 | 12/1986 | Voss | 371/68 |
| 4,635,209 | 1/1987 | Hwang et al. | 364/494 |
| 4,649,469 | 3/1987 | Gabillet | 371/68 |
| 4,700,117 | 10/1987 | Giebeler | 318/327 |
| 4,745,542 | 5/1988 | Baba et al. | 371/68 |

Primary Examiner—Allen MacDonald

[57] ABSTRACT

The present invention relates to control architecture for a centrifuge motor speed control system having dual processors. The processors are configured in a master-slave relationship for some predetermined subset of instrument control functions during the execution of which the slave operates under the direction of the master to effect that subset of control functions. However, each of the processors is independently responsive to a speed signal from a tachometer and is independently capable of controlling the additional instrument control function of conditionally coupling the motor to a source of energy.

1 Claim, 4 Drawing Sheets

CENTRIFUGE CONTROL SYSTEM HAVING DUAL PROCESSORS

FIELD OF THE INVENTION

This invention relates to a control system for a centrifuge instrument and, in particular, to a control system having a control architecture that utilizes two processors.

DESCRIPTION OF THE PRIOR ART

A centrifuge rotor is a relatively massive member adapted to expose a sample of a liquid to a centrifugal force field. To create the force field the rotor is rotated to a relatively high rotational speed. However, if the rotational speed to which the rotor is accelerated is too high the possibility exists that the rotor may fail catastrophically. In order to prevent this failure from occurring most centrifuge instruments utilize a microprocessor-based speed control system having a single processor therein to limit the maximum rotational speed to which the rotor is subjected to a value which is well below the speed of catastrophic failure of the rotor.

The possibility exists in a microprocessorbased control system that the processor may fail, thus vitiating the speed control function performed thereby. To guard against this deleterious consequence control schemes are known which monitor the operability of the processor. One example of a system with such a "watchdog" circuit is the RC-5C Centrifuge instrument manufactured and sold marketed by the Medical Products Department of E. I. du Pont de Nemours and Company, Inc. This system includes a capacitor which, under the control of the processor, is periodically discharged during the normal operation of the control system. The discharged capacitor prevents a system reset command from being issued. Should the processor fail the capacitor would not be discharged and a system reset would occur. One of the responses to a system reset is the interruption of power to the instrument, thus stopping rotor rotation.

Other examples of microprocessor-based systems, though not specifically applied to a centrifuge instrument, are disclosed in the turbine control systems of U.S. Pat. Nos. 4,635,209 (Hwang et al.), 4,494,207 (Chang et al.), 4,494,208 (Chang) and 4,319,320 (Sato et al.).

It is believed advantageous to provide a microprocessor-based centrifuge instrument control system configured with multiple processors such that each of the processors may independently perform a given control function and to implement such a system in an economically practical manner.

SUMMARY OF THE INVENTION

The present invention relates to a control system for a centrifuge instrument having a motor with a shaft, the motor being connected to a source of energy. The motor is operative to rotate the shaft to a predetermined rotational speed. A tachometer is associated with the shaft and is operative to generate a signal representative of the actual rotational speed thereof. The control system includes a programmable controller operative to provide a predetermined set of instrument control functions including the function of conditionally coupling of the source to the motor.

In accordance with the present invention the programmable controller has a first and a second processor therein, the processors being configured in a master-slave relationship for some predetermined subset of the instrument control functions during the execution of which the slave operates under the direction of the master to effect that subset of control functions. However, each of the processors is independently responsive to the speed signal from the tachometer and is independently capable of controlling the additional instrument control function of conditionally coupling the source to the motor.

BRIEF DESCRIPTION OF THE DRAWINGS

The invention will be more fully understood from the following detailed description thereof, taken in connection with the accompanying drawings, which form a part of this application, and in which:

FIG. 3A is a flow diagram of the subroutine used by one of the processors in the control system of the present invention to generate an enabling control signal to the motor power drive which conditionally couples the source to the motor while

Figure 1:
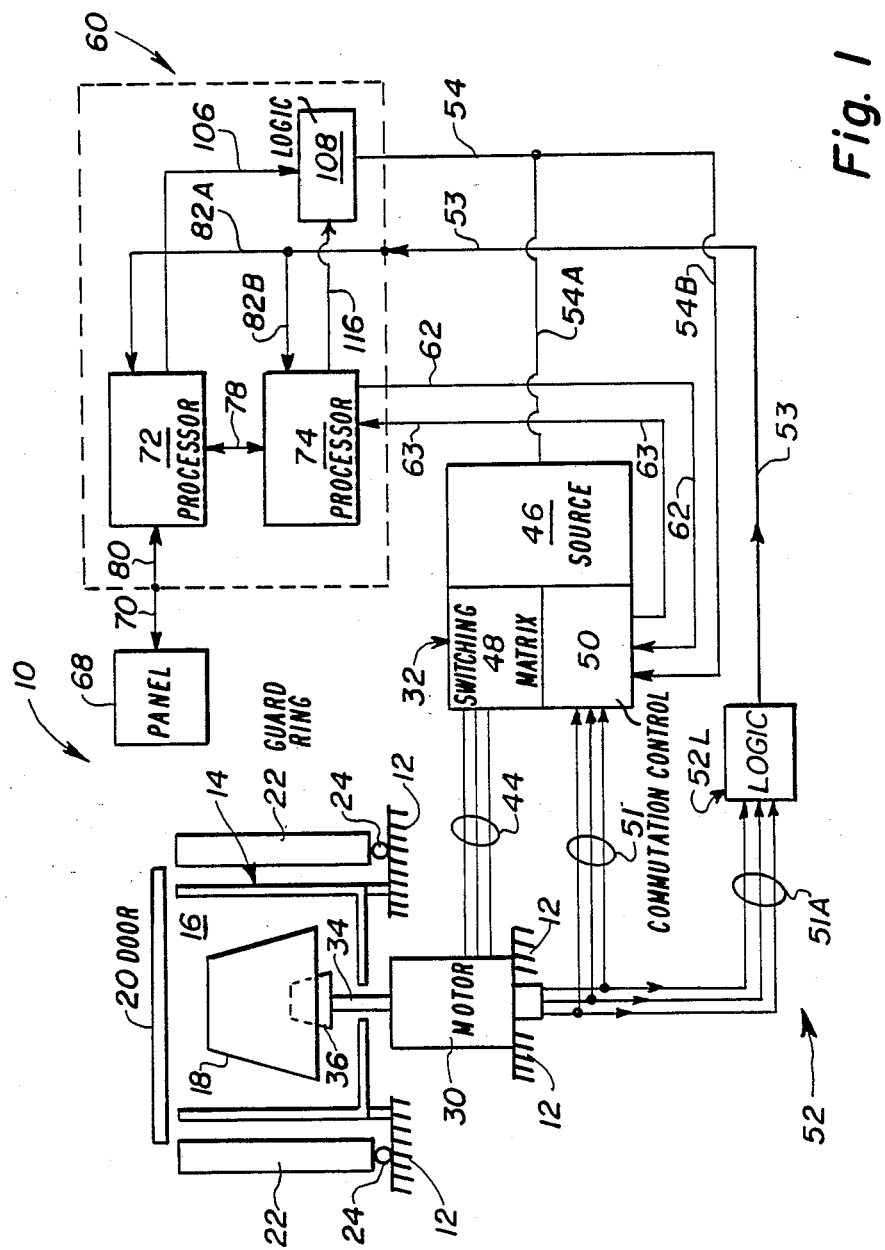
FIG. 1 is a highly stylized pictorial representation of a centrifuge instrument with which a dual processor control system, shown in block diagram form, in accordance with the present invention may be used.

An Appendix of the listing for each of the processors used in the control system of the present invention is attached to and forms part of this application. The listing is set forth in MC6809 and MC6803 assembly languages. The listing, pages A-1 through A-15 inclusive, is appended to the application before the claims.

DETAILED DESCRIPTION OF THE INVENTION

Throughout the following detailed description of the invention similar reference numerals refer to similar elements in all figures of the drawings and in the Appendix.

Shown in FIG. 1 is a stylized pictorial representation of a centrifuge instrument generally indicated by reference character 10 embodying the teachings of the present invention. The instrument 10 includes a framework schematically indicated at 12. The framework 12 supports a chamber, or bowl, 14. The interior of the bowl 14 defines a generally enclosed chamber 16 in which a rotating element, or rotor, 18 may be received. Access to the chamber 16 on the interior of the bowl 14 is afforded through a lid or door 20. The bowl 14 may be provided with suitable evaporator coils, not shown, in the event that it is desired to refrigerate the bowl 14 and the rotor 18 and its contents.

One or more energy containment members, or guard rings, 22 is carried by the framework 12. The guard ring 22 is arranged concentrically with respect to the bowl 14 and serves to absorb the kinetic energy of the rotor 18 or fragments thereof should a catastrophic failure of the rotor 18 occur. The guard ring 22 is movably mounted within the framework 12, as schematically indicated by the rollers 24, to permit free rotation thereof to absorb the rotational component of the energy of the rotor fragments. It is important to absorb the energy of the rotor and to contain the possible fragments thereof which, if permitted to exit the instrument, may cause injury to an operator.

A drive motor 30, such as a brushless DC electric motor, is mounted within the framework 12. The motor 30 is connected to a source of electrical energy through a DC power drive generally indicated by reference character 32. The motor 30 includes a drive shaft 34 that projects into the chamber 16. The upper end of the shaft 34 is provided with a mounting spud 36 which receives the rotor 18.

In the preferred instance the motor 30 takes the form of a multiphase brushless DC motor such as that manufactured and sold by Electric Indicator Company Incorporated of Norwalk, Conn. The power drive 32 is associated with the motor 30 provides a controlled electric current to the motor 32 over lines 44. The power drive 32 includes a variable voltage source 46, a switching matrix 48 and a commutation control 50. A typical example of a power drive for a brushless DC motor is illustrated in U.S. Pat. No. 3,783,359 (Malkiel), which is hereby incorporated by reference.

The motor 30 includes a plurality of Hall Effect sensors (not shown), the outputs of which are provided over the lines 51 to the commutation control 50 of the drive 32. A tachometer generally indicated by reference character 52 is arranged to monitor the rotational speed (i.e., angular velocity) of the shaft 34 and thereby the rotational speed (i.e., angular velocity) of the rotor 18. In the preferred case the tachometer 52 is implemented using the outputs of the Hall Effect sensors which are applied over the lines 51A to a logic network 52L. The Hall Effect outputs are exclusively OR-ed in the logic 52L. The electrical signal produced by the logic 52L is carried on a line 53. The signal on the line 53 provides an indication of the rotational speed (angular velocity) of the shaft 34 and the rotor 18 mounted thereon. This signal on the line 53 is referred to as the tachometer signal.

The elements 46 and 50 of the power drive 32 are responsive to an enable signal derived in a manner to be described and applied to these elements over lines 54A and 54B respectively. The enable signal on the line 54A applies a voltage from the variable voltage source 46 to the switching matrix 48. The enable signal on the line 54B enables the normal commutation sequence of the switching matrix 48 via the commutation control 50. The signal applied over the lines 54A, 54B functions to conditionally couple the source 46 to the motor 30.

A programmable controller 60 having a control architecture in accordance with the present invention is responsive in a manner to be described to the tachometer signal on the line 53 representative of the rotor speed. The programmable controller 60 outputs a motor current control signal on a line 62 to the motor power drive 32. A status line 63 is provided between the motor power drive 32 and the programmable controller 60. The motor power drive 32 responds to the signal on the line 62 to modify appropriately the level of current applied to the motor 30 and thereby control the torque output of the motor 30 and thus the rotational speed of the shaft 34 and the rotor 18 thereon. The programmable controller 60 also generates the enable signal carried on the lines 54A and 54B to carry out the instrument control function of conditionally coupling the source 46 to the motor 30. An operator control panel 68 communicates with the programmable controller 60 over a line 70 and permits an operator to enter desired run parameters, including a requested rotational speed (angular velocity) for the rotor. The panel also displays the actual operating parameters.

In the preferred instance the programmable controller 60 is implemented by an arrangement comprising a first and a second processor 72 and 74 respectively. As will be discussed the processors 72, 74 are arranged in a architecture believed best described as a hybrid distributed processing system. The first processor 72 is implemented by a device manufactured and sold by Motorola as model number MC6809 while the second processor is manufactured and sold by Motorola as model MC6803. The processors 72 and 74 communicate with each other over a multibit link 78.

The overall task of controlling the centrifuge instrument 10 is divided between the first and second processors 72 and 74, respectively. As will be seen generating the enable signal on the line 54 requires both processors 72, 74. Removal of the enable signal can be accomplished independently by either processor.

The first processor 72 is directly connected via a line 80 on the processor board to the line 70 from the operator panel 68. The first processor 72 is responsible to superintend the performance of the overall set of instrument control functions necessary to the operation of the instrument 10. In order for the processor 72 so to act it serves to receive the operator selected set points (including rotational speed) and outputs of this set point information in a suitable form to the second processor 74 over the link 78. The first processor 72 also receives control status information from the second processor 74 over the link 78 and also sends status information for display on the operator panel 68. In addition, information regarding the speed of the shaft 34 is input to the processor 72 on a line 82A on the processor board. The line 82A is connected to the line 53 carrying the tachometer signal. From the standpoint of instrument control functions the processor 72 also serves to remove the enable signal applied to the power drive 32 on the lines 54A and 54B whereby the source 46 is conditionally coupled to the motor 30.

The second processor 74 is, in the normal operation of the instrument, connected in what may be described as a slave relationship to the first processor 72. As such the second processor 74 receives the set point information and executes the actions necessary to carry out some predetermined subset of the instrument control functions. In addition the second processor 74 acts independently of and co-equally with the first processor 72 to remove the enable signal on the lines 54A and 54B which effects the additional instrument control function of conditionally coupling the source 46 to the motor 30. To this end the second processor 74 is also supplied with the tachometer signal on the line 53. This information is applied to the second processor 74 via a line 82B connected to the line 53.

Figure 2:
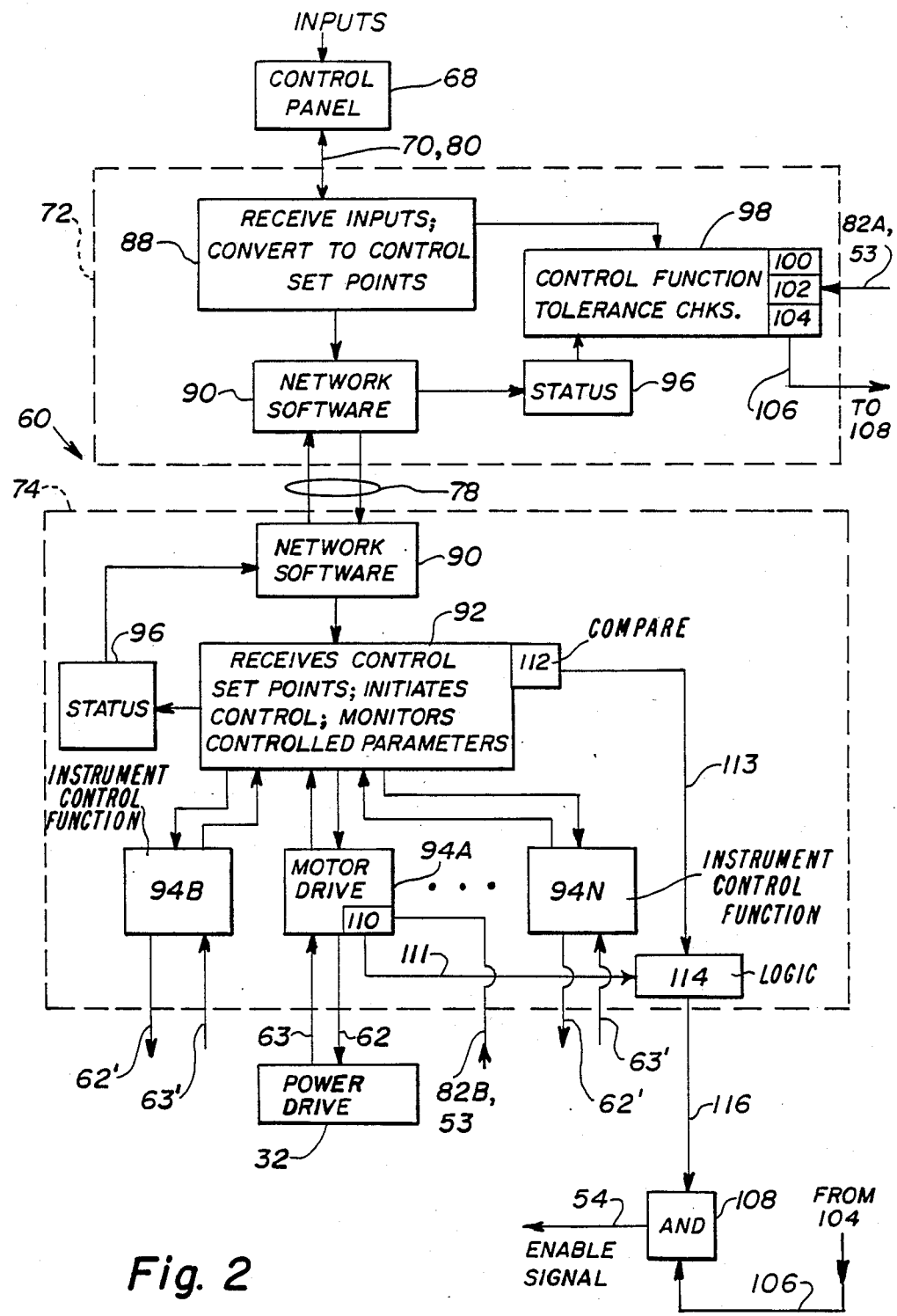
FIG. 2 is an overall functional diagram of the division of responsibility between the first and second processors used in the control system of the present invention.
Figure 3A:
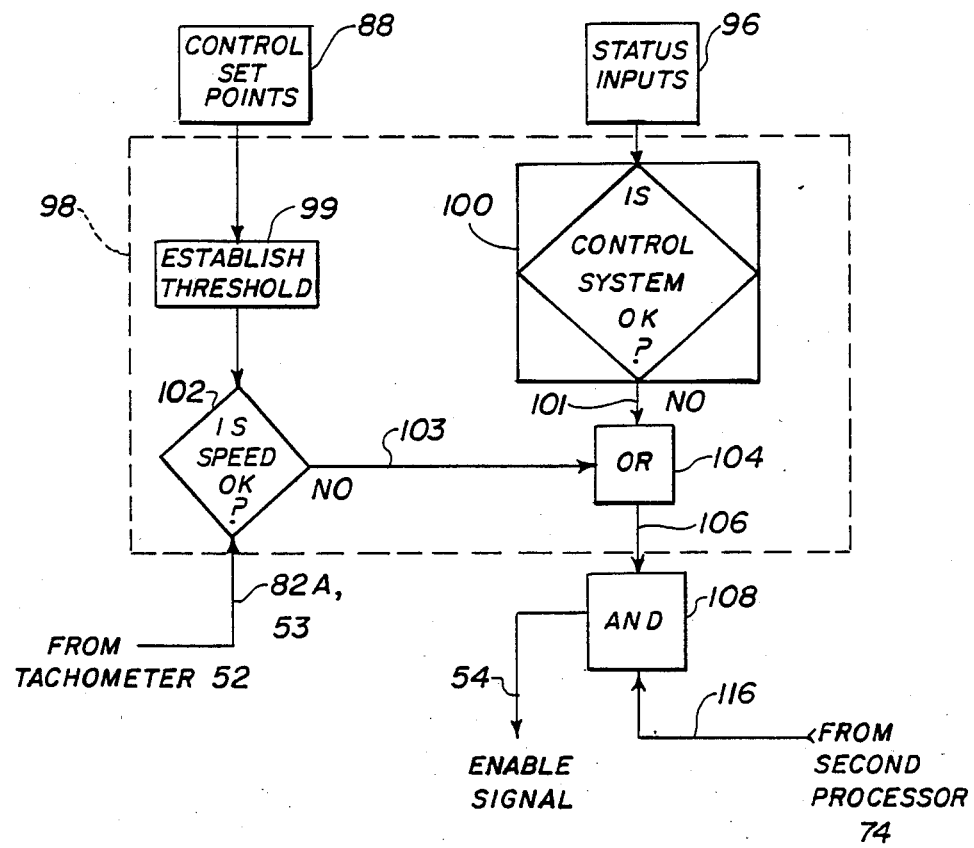
Figure 3B:
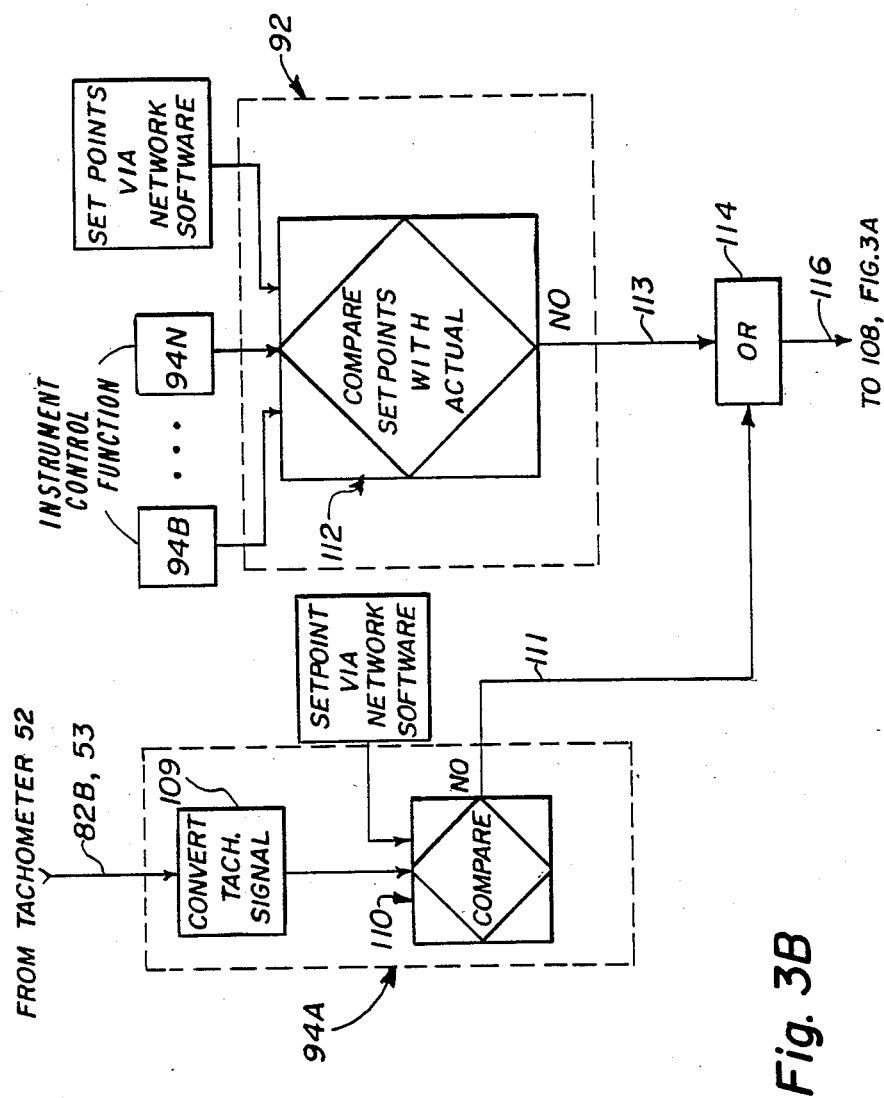
FIG. 3B is a flow diagram of the subroutine used by the other of the processors for the same purpose.

This division of processor control responsibility for the instrument control functions needed to operate the centrifuge instrument 10 can be best understood with reference to the flow diagrams set forth in FIGS. 2, 3A and 3B hereof.

As seen from FIG. 2 the first processor 72 receives an operator input through the operator control panel 68 and operates on the same, as indicated at block 88. The block 88 receives the inputs and converts them to control setpoints. These control setpoints are passed by the first processor 72 over the multibit link 78 to the second processor 74 using suitable network software 90. The control setpoints are operated on by the second processor 74, as indicated at block 92, to effect a predetermined subset of the total set of appropriate instrument control functions. The subset of instrument control functions is indicated diagrammatically by the blocks 94A, 94B . . . 94N. The second processor 74 generates status information on each of the set of control functions 94A through 94N, as shown at the block 96, and reports the same to the first processor via the network software 90 and the link 78.

For example, one of the set of instrument control functions is the instrument motor drive control function as indicated in the block 94A. This function 94A generates the motor current control signal to the power drive 32 over the line 62. Status information from the power drive 32 is provided to the second processor 74 on the status line 63. Similar (i.e., control and status lines) are provided for the others of the subset of instrument control functions, as indicated by the lines 62', 63', respectively.

It may thus be appreciated that the processors 72 and 74 act substantially in a master/slave relationship for the implementation of the predetermined subset of the total set of the instrument control functions.

In accordance with the present invention, both the first processor 72 and the second processor 74 are simultaneously active and each is independently able to execute the additional instrument control function of conditionally coupling the source 46 to the motor 30.

In the case of the first processor 72 this instrument control function is carried out by the block 98. As seen in FIG. 3A the block 98 uses the control set points derived from the block 88 to set a speed threshold in functional block 99. The threshold itself corresponds to the rotational speed as selected by an operator plus some predetermined margin (e.g., four hundred rpm). The speed threshold is used in a manner to be described. In addition the first processor 72, in the block 100, verifies whether the communication link 78 between the first and second processor is operative or, in one instance, whether the instrument is indeed decelerating the load when appropriate.

With respect to the speed threshold the first processor 72 receives the tachometer signal on the lines 53, 82A. When a run start is requested by an operator from the panel 68 the process 72, after verifying conditions are suitable for a run, asserts a logic true on its enable line 106. If the tachometer signal indicates a speed that exceeds the speed threshold, as determined in the block 102, a fault condition on the line 103 is established. In the block 100 a determination is made as to whether the appropriate deceleration is occurring or whether the communications system is operational. The results of the determinations made in the block 100 and the determinations made in the block 102 (applied over the lines 101 and 103, respectively) are logically OR-ed in the block 104 to produce a logical false on a line 106. The signal on line 106 is applied to a logic AND hardware network 108.

The preferred implementation of these functions may be understood with reference to pages A-1 through A-11 of the attached Appendix. This portion of the Appendix is a listing of the appropriate portions of the program for the first processor, n MC6809 assembly language.

The generation of the threshold value in the block 99 is set forth on page A-2 of the listing. Entry to the block 99 may be made from one of four routines (STrap5s, STrap5, STrap 67 or STrap8). In general these four routines are implemented when either a change of speed set point or a stop of rotor is requested. In any event, from whatever routine the threshold block 99 is entered, the listing on page A-2 generates the necessary threshold value.

The block 102 basically performs a comparison (termed "HiTrap" in the listing) between the period of the tachometer signal on the line 53, 82A with the period of a reference signal that corresponds to the threshold signal. The comparison is actually performed in hardware, such as a timer (an MC6840 timer) that is set with a value corresponding to the period of the reference signal. Pages A-1, A-3, and A-4 set forth the code whereby the timer is loaded. The timer begins decrementing on each falling edge of the tachometer signal. The result of the comparison is insulated from transients by the portion of the code set out on pages A-10 and A-11 of the listing. This portion of the code requires that the fault be established under a predetermined number of times (eight, in the listing) before the fault is asserted on the line 103. The speed comparison is acceptable if the period of the tachometer signal is greater than the period of the reference signal. The setting of the fault condition on line 103 is accomplished at page A-9 of the listing.

Among the determinations made in the block 100 is a determination that the rotor is indeed being braked when such a command is issued (termed "SpChang" in the listing) and the verification of the operability of the communications over the line 78 between the processors 72, 74 (termed the fault conditions of flags "ComOEr" and "ComIEr" in the listing, page A-9). The full text of the listings needed to generate these flags is not included as being peripheral to the invention claimed herein.

The logical OR of the flag "HiTrap" (generated by the block 102 in response to the tachometer signal as discussed above) and the flags generated by the block 100 is formed by the code set forth on page A-9 of the listing that actually implements the block 104. The setting of the logical false on the line 106 is accomplished by the code noted on that same page of the listing.

In the case of the second processor 74 the instrument control function of conditionally coupling the source to the motor is executed by a subroutine 110 within the motor drive control block 94A. A listing of the relevant portions of the program for the second processor 74, in assembly language for an MC6903 processor, is attached as pages A-12 through A-15 of the Appendix. Similar to the processor 72, when a run start is requested the processor 74, after verifying that conditions are suitable for a run, asserts a logic true in its enable line 116. As seen in FIG. 3B and at pages A-12 and A-13 of the listing the block 109 converts the tachometer signal on the lines 53, 82B provide a representation of the rotational speed of the shaft. The block 110 (page A-13) performs a comparison with a speed setpoint (as derived via the network) to determine whether the shaft speed is within acceptable control limits. If the speed is within the control limit the processor 74 continues with normal control. However, if the comparison indicates that the speed of the shaft is outside the control limit the line 111 is asserted. As seen at page A-13 of the listing, the actual code executed is a jump to a subroutine "scfunc 24." In FIG. 3B, this is indicated by a signal on the line 111 to the network 114.

The block 92 performs a similar determination in subroutine block 112 for each of the other instrument control functions 94B through 94N. If any one of the control functions is beyond the acceptable control range a particular bit in the byte "Faults" is set. The code on page A-15 of the listing implements an examination of the byte "Faults." If any flag bit in the byte has been set the branch to the subroutine "sc-func 24" is asserted on the line 113. If no flag is set, normal control continues.

The results of the determinations made in the blocks 110, and 112 are logically OR-ed in the block 114 to produce a logical false on a line 116. Setting the logical false on the line 116 is accomplished by the subroutine "sc-func 24" set forth at page A-14. This code implements the block 114. The signal on the line 116 is applied to network 108.

In the block 108 (FIGS. 2 and 3A) the motor drive enable signal carried on the 54 (which splits into lines 54A and 54B) is asserted only if the inputs on the lines 106 and 116 are logical true. If either of the lines 106 or 116 is logical false then the motor drive enablement signal is not asserted. In this sense both the first processor 72 and the second processor 74 are each responsive to the tachometer signal and both are simultaneously active and independently capable of removing the enable signal. Both the first processor and the second processor are thus each independently capable of carrying out the instrument control function of conditionally coupling the energy source 46 to the motor 30. So long as the states of the signals on the lines 106, 116 indicate that the instrument's operation is acceptable, energy is applied to the motor. If the state of either line changes the motor is decoupled from the source. The decoupling can be independently controlled by either processor.

Those skilled in the art having the benefit of the teachings of the present invention as hereinabove set forth may effect numerous modifications thereto. It should be appreciated that these modifications lie within the contemplation of the present invention as defined by the appended claims.

```
*
*              S T R A P . S R C
*
*         6809 host program service routines
*
* Created by: Gerald E. Fries
*
*    Timer#2 of U1(MC6840) is setup to operate in the frequency compare
*    mode. In this mode, the Timer#2 begins to decrament at a rate of
*    once/us on the falling edge of the tachometer signal, if the next
*    falling edge occures befor Timer#2 reaches 0000, an interrupt is
*    generated. A system fault is declared if eight interrupts occure
*    durring a run. The value for Timer#2 is the period(us) calculated
*    from either the current speed or the set speed, depending on the
*    state of the flag HiSlide. If the entered speed is grater than the
*    current speed, HiSlide is cleared and Timer#2 is set to the period(us)
*    of the entered speed +400 Rpm. If the entered speed is less than the
*    current speed, HiSlide is set and Timer#2 is set to the period(us)
*    of the current speed +400 Rpm. The flag HiSlide is cleared when the
*    current speed equals the set speed +/- 200 Rpm. Timer#3 is disabled
*    for speeds below 1200 Rpm.
*

*
** if HiSlide=1 then HiTrap= slide(Speed) else HiTrap= set(RunSpd)
*-- called by State(5) when a new RunSpd is detected
*-- called by State(8) when first entered(once)
STrap5s  ldx      RunSpd
         lda      DiagSW
         anda     #F_HiSlide
         bne      1$                  ;DiagSW( HiSlide )=1
         bra      HiTrap              ;HiTrap= RunSpd(fixed)
1$       ldx      Speed               ;HiTrap= Speed(down slide)
         stx      STSpeed
         bra      HiTrap
*
** HiTrap= slide(Speed)
*-- called by State(5) when driving towards RunSpd
STrap5   lda      DiagSW
         anda     #F_HiSlide
         bne      STrap8              ;DiagSW( HiSlide )=1
         rts
*
** HiTrap= slide(Speed)
*-- called by State(8) when driving to zero speed
STrap8   ldx      Speed
         cmpx     STSpeed
         blc      1$                  ;Speed < old-Speed
         rts
1$       stx      STSpeed
         bra      HiTrap
*
```

```
**  HiTrap= set(RunSpd)
*-- called by State(5) when transitioning to State(6 or 7)
STrap67  lda       DiagSW
         anda      #-1-F_HiSlide     ;DiagSW(HiSlide)=0(off)
         sta       DiagSW
         ldy       RunSpd

*#01  HiTrap(X):  (X= Trap Speed)
*#09  ^ if DiagSW <> Run_Simulater then do
*#02  ^ ^ if X<1200 or IrqFlt(HiTrap)=1 then do
*#03  ^ ^ ^ if TimCR2(IRQ)=(on) then TimCR2(IRQ)=(off) (disable IRQ)
*#04  ^ ^ end
*#05  ^ ^ else do
*#06  ^ ^ ^ Y=(X+400)
*#12  ^ ^ ^ Call(CvtPrd(Y))
*#13  ^ ^ ^ B=MathEr(HiTrap)
*#14  ^ ^ ^ if MthErr<>0 then Call(TrapEr)
*#15  ^ ^ ^ else TOSpd=Y
*#07  ^ ^ ^ if TimCR2(IRQ)=(off) then TimCR2(IRQ)=(on) (enable IRQ)
*#10  ^ ^ end
*#16  ^ end
*#17  return
*
*
*
HiTrap   lda       DiagSW            ;check if either Run_Simulater is active
         anda      #DJumper
         cmpa      #DrSimm           ;Door Run_Simmulater active ?
         beq       3$                ;yes, skip Trap
         cmpa      #AIDSimm          ;AutoID Run_Simmulater active ?
         beq       3$                ;yes, skip Trap
         cmpx      #1200/2           ;check if above minimum Trap speed (1200 Rpm)
         blo       1$                ;no, X<1200 Rpm, disable HiTrap
         leay      (400/2),x         ; else Y=(X+400) Rpm
         lda       IrqFlt
         anda      #F_HiTrap         ;check if HiTrap has already occured
         beq       2$                ;no, IrqFlt(HiTrap)<>1, keep testing
1$       lda       TimCR2            ,<<-- disable HiTrap IRQ
         bita      #$40              ;check if Timer#2's IRQ is disabled
         beq       3$                ;yes, Timer#2(IRQ)=0 (off)
         anda      #$bf              ; else disable Timer#2's IRQ
         bra       7$                ; end exit
2$       bsr       CvtPrd            ;convert Y(speed+400) to Y(period us)
         ldb       #$80              ;CvtPrd math error flag
         tsta
         bne       TrapEr            ;conversion math error exit
         sty       TOSpd             ;clears Timer#2's IRQ if set
         lda       TimCR2            ;<<-- enable HiTrap IRQ
         bita      #$40              ;check if Timer#2's IRQ is enabled
         bne       3$                ;TimCR2(IRQ)=1 (on)
         ora       #$40              ; else enable Timer#2's IRQ
7$       sta       TimCR2
         sta       Tcr2
3$       rts
TrapEr   ora       MathEr            ;set trap math error flag
         sta       MathEr
         rts
*
*
*
* CvtPrd:= Y=Fix(30000000/Float(Y)), Tmp,A,B,X,Y,U are distroyed
*  Entry: Y= Speed[+200](Rpm/2) to be converted to period(usec.)
*  Exit:  Y= Period (usec*10^6), A= math error flag
*
*-- (1 pls/rev)Ex. for 18000 Rpm, Y=9000, and 30000000/9000= 3333 (us)
*---      and 18000 Rpm= 300 rev/sec= 3333 us/rev
*---      Tach= 1 puls/rev so (period 3333 us/rev)/1= 3333 us
*
*- if a frequency other then 1 pls/rev is used, for example 2 pls/rev, then
```

```
*-- (2 pls/rev)Ex. for 18000 Rpm, Y=9000, and 15000000/9000= 1666 (us)
*---    and 18000 Rpm= 300 rev/sec= 3333 us/rev
*---    Tach= 2 puls/rev so (period 3333 us/rev)/2= 1666.5 us
*
*- X=: 30000000 for 1 pls/rev
*- X=: 15000000 for 2 pls/rev
*
*
CvtPrd  ldx     #FP30meg
        jsr     LdXM1           ;x1/m1= (30000000) 1 pls/rev
        clr     MthErr
        ldx     #Tmp
        stx     result
        jsr     FloatY          ;Tmp= Float(Y)
        jsr     FdivX           ;Tmp= 30000000/Tmp
        jsr     FixBY           ;Y= Fix(Tmp)
        lda     MthErr
        rts
```

```
*                    S T A T E 8 . S R C
*
*               6809 Host program State Routine
*
* Created by Gerald E. Fries
*
*
*
*
*** State(8)          Brake
*
*+*+*+*+*+*+*+*+*+*+*+*+*+*+*+*+*+*+*+*+*+*+*+*+*+*+*+*+*
*#01 Brake   (#8)
*#03 ^ if OprCtl(Start)=1 then do
*#04 ^ ^ OprCtl(Start)=0
*#02 ^ ^ if (DFault(1,2,3,4)-OvrTmp-ImbalF)<>0 then call STrap8
*#22 ^ ^ else do
*#40 ^ ^ ^ DFault(1)=(DFault(1)-OvrTmp-ImbalF)
*#42 ^ ^ ^ call KPrompt(0)
*#41 ^ ^ ^ HFault(OvrTmp)=0
*#43 ^ ^ ^ Faults(ImbalF)=0
*#05 ^ ^ ^ Status(RnFalt,EOfRun,NewSet)=0,0,1
*#47 ^ ^ ^ if Status(VcEnat)=1 then do
*#48 ^ ^ ^    if SetSpd > VacSpd then Status(Vacuum)=1
*#49 ^ ^ ^ end
*#07 ^ ^ ^ State=5
*#08 ^ ^ end
*#15 ^ end
*#16 ^ else if SState=0 then do
*#19 ^ ^ DiagSW(THsld)=1
*#33 ^ ^ D.Time=15 sec (#150)
*#34 ^ ^ D.Speed = Speed
*#19 ^ ^ SState=1
*#35 ^ ^ if DFault(OvrTmp)=1 then call BPrompt(P_OvTmp)
*#36 ^ ^ else if DFault(ImbalF)=1 then call BPrompt(P_Imbal)
*#20 ^ ^ call STrap5s
*#21 ^ end
*#24 ^ else do (SState=1)
*#06 ^ ^ call STrap8
*#44 ^ ^ if Status(Vacuum)<>0 then do
*#45 ^ ^ ^ if DspSpd≤2500 Rpm then Status(Vacuum)=0
*#46 ^ ^ end
*#32 ^ ^ if Speed < DcSpeed then do
*#37 ^ ^ ^ DvTime= 15 sec  (#150)
*#38 ^ ^ ^ DcSpeed= Speed
*#39 ^ ^ end
*#09 ^ ^ if SpChang= 0
****        or IrqFlt(F_HiTrap)<>0
****        or HFault(F_ComOEr,F_ComIEr)<>0,0
****        or DvStat(ZroSpd)=1 then do
*#28 ^ ^ ^ if Status(DvEnab)=1 then do
*#11 ^ ^ ^ ^ Status(DvEnat)=0
*#10 ^ ^ ^ ^ Output(DvEnat*)=1 (off)
```

```
**#25  ^ ^ ^   if DvStat(ZroSpd)<>1 then call BPrompt(P_HFalt)
**#29  ^ ^ ^ end
**#26  ^ ^ ^ else if DvStat(ZroSpd)=1 then do
**#12  ^ ^ ^ ^   DvTime=10sec   (#100)
**#13  ^ ^ ^ ^   State=9
**#31  ^ ^ ^ ^   Status(Vacuum)=0
**#23  ^ ^ ^ end
**#27  ^ ^ end
**#14  ^ end
**#17 return
*
*
BrakSB  lda      OprCtl
        bita     #Op_Strt
        beq      16$              ;Start=0
*
*-- service Start switch for a reStart
*
        anda     #-1-Op_Strt      ;Start=0
        sta      OprCtl
        lda      DFault+1
        anda     #$6f             ;DFault(HFault(OvrTmp),Faults(ImbalF))=0,0
        ora      DFault+2
        ora      DFault+3
        ora      DFault+4
        beq      22$              ;no fatel faults, continue with reStart
        jmp      STrapS           ; else ignore reStart
22$     sta      DFault+1         ;A=00
        jsr      KPrompt          ;A=00, clear any prompt message
        lda      HFault
        anda     #-1-F_OvrTmp     ;clear HFault(OvrTmp)
        sta      HFault
        lda      Faults+1
        anda     #-1-F_ImbalF     ;clear Faults(Imbal)
        sta      Faults+1
        ldd      Status
        ancb     #-1-S1_RFlt-S1_EDR ;RnFalt,EDfRun=0,0
        orb      #S1_NSet         ;NewSet=1
        bitb     #S1_VEna
        beq      49$              ;Status(VcEnab)=0(not enabled)
        ldx      SetSpd
        cmpx     VacSpd
        blc      49$              ;SetSpd < VacSpd, no vacuum
        ora      #S0_Vcum         ;Status(Vacuum)=1(turn on vacuum)
49$     std      Status
        lda      #5               ;reStart returns to State(5)
        sta      NState
        rts                       ;done, RETURN
*
*-- not reStart, do the normal stuf
16$     tst      SState
        bne      24$
*
*-- SubState(0), exicutes once
*
        lda      DiagSW
        ora      #F_HiSlide       ;enable High-Slide
        sta      DiagSW
        lda      #150
        sta      DvTime           ;DvTime= 15 sec
        lda      #120             ;set SpChang to 12.0 sec.         #1#
        sta      SpChang
        inc      SState
        lda      #P_OvTmp
        ldb      DFault+1
        bitb     #$10             ;test for DFault+1(OvrTmp)
        bne      136$             ;error exit
        lda      #P_Imbal
        bitb     #$80             ;test for DFault+1(ImablF)
        beq      20$              ;no error exit
136$    jsr      BPrompt
20$     jmp      STrap5s          ;call STrap5s and RETURN
```

```
*-- SubState(1), executes untill Speed=0000, State(9)
*
24$     jsr     STrap8          ; else call STrap8
        lda     Status
        bita    #SO_Vcum
        beq     9$              ;Status(Vacuum)=0
        ldx     DspSpd
        cmpx    #(2500/2)
        bhi     9$              ;DspSpd > 2500 Rpm
        anda    #-1-SO_Vcum
        sta     Status          ;Status(Vacuum)=0(release)
*-- check for Fatel fault and normal End_Of_Run
9$      tst     SpChang         ;12 sec. decell delay from Filter #1#
        beq     28$             ;SpChang=0, disable drive
        lda     IrqFlt
        anda    #F_HiTrap                                                       103
        bne     28$             ;HiTrap fault, disable drive
        lda     HFault
        anda    #F_ComOEr+F_ComIEr
        bne     28$             ;Comm(Input or Output) fault, disable drive
        lda     DvStat
        anda    #DO_ZSpd
        beq     17$             ;ZroSpd<>1 (not zero speed so not End_Of_Run)
*-- Fatel fault or normal End_Of_Run entry point, this only exicutes once
                                                                                104
28$     lda     Status
        bita    #SD_Driv
        beq     26$             ;Status(DvEnab)<>1, drive is disabled
        anda    #-1-SD_Driv     ; else DvEnab=0
        sta     Status
        lda     orb7
        ora     #DvEnab         ; and DvEnab*=1 (off)
        sta     orb7
        lda     DvStat                                                          106
        anda    #DO_ZSpd        ;check for normal End_Of_Run
        bne     17$             ;yes, DvStat(ZroSpd)=1 (zero speed)
        lda     #P_HFalt        ; else HOST Fault shut-down
        jsr     BPrompt         ;display "** HOST shut-down **" and RETURN
        bra     17$
*-- wait for Speed=0000, end of State(8)
26$     lda     DvStat
        anda    #DO_ZSpd
        beq     17$             ;DvStat(ZroSpd)<>1, RETURN
        lda     #100
        sta     DvTime
        lda     #9
        sta     NState
        lda     Status
        anda    #-1-SO_Vcum
        sta     Status          ;Status(Vacuum)=0(release)
17$     rts
*       nam     STATE2
        subttl  Interrupt Poll
*
*               I R Q N M I . S R C
*       6809 host program interrupt poll rutine
*
* Created on: ?                        Created by: Gerry Fries
*
*
*               Modification History
* Who    Date     Description
* GF 08-Oct-87 #1# changed Y(1)+Yoffset
* GF 18-Nov-87 #2# removed #1#
*
        page
*
** NMI (UnUsed)
*
Nmix    nop                     ;NOT USED
        bra     Nmix            ;loop forever if you get here
*
** LoTrap FIRQ (Timer#1)
*
```

```
T1urr     ldb      InitCtr              ;clear Timer#1's IRQ flag
          rts

*
** HiTrap FIRQ (Timer#2)
*
TDSirq    ldb      TDSpd                ;clear Timer#2's irq flag
          ldb      TrapHit              ;add a hit to TrapHit counter
          addr     #$10
          bmi      1$                   ;skip for >8th. hits
          stb      TrapHit
          rts
1$        ldb      IrqFlt
          orb      #F_HiTrap            ;IrqFlt(HiTrap)=1
          stb      IrqFlt
          ldb      TimCR2               ;disable Timer#2 IRQ
          anda     #$hf
          stb      TimCR2
          st       Tcr2
          rts
          page
*
** FIRQ Timer#3 is used to measure Rotor(-,Y) ID values
*   this should only execute in IDState#2
*
IDGate    pshs     a                    ;push a byte onto the stack for IDSexit rutine
          lda      IDVflg               ;check for IDVflg(IDState)= 2
          anda     #IDState             ;mask off IDState
          cmpa     #2
          bne      6$                   ;IDState<>2, exit
          ldb      DxPos                ;B= Door X position
          cmpb     #Xmax                ;check door position
          bls      7$                   ;Good Door Position, continue
6$        ldb      TID                  ;clear Timer#3 firq flag
          bra      5$                   ; and exit
7$        ldx      #IDBufr              ;X=> IDBuffer, X saved by firq-poll
          lslb                          ;B=B*2 for 2 byte Y entrys in buffer
          abx                           ;X=> Y position in IDbufr for this DxPos
          ldd      #0                   ;IDGate timer is a down-counter
          subd     CRyPos               ;D= Ypos, Timer#3 in MC6840
*         cmpx     #IDBufr+(2*1)        ;check if X=> Y(1)              NEW...   #1#2#
*         beq      10$                  ;yes, don't add Yoffset to Y(1) NEW...   #1#2#
          addd     Yoffset              ;adjust Y with offset
10$       cmpd     #Ymax                ;check for D > Ymax (Y overflow)         #1#
          blo      1$                   ;no, return Timer#3's value
          ldd      #Ymax                ;else return Ymax (2100)
1$        std      ,x                   ;save it in buffer
          std      Yvalue               ;save Y for Dynamic display
5$        lda      #1                   ;setup for IDState=1(loop) exit, for IDSexit
          jmp      IDSexit               ;update to IDState=1, exit firq
          page
*
*** VIA#1 interrupts
Firqx     pshs     a,b,x
          lda      ifr6                 ;via#6 firq pole
          bpl      Txfirq               ;not via#6 firq, check if Timer firq
          anda     ier6                 ;mask for enabled interrupts
          sta      ifr6                 ;clear all enabled interrupt flags
          bita     #DxStep              ;test for Door Step irq (CA1)
          beq      1$                   ;NOT DxStep IRQ
          jsr      StepIrq              ;go process Door-Step irq
1$        bita     #LCIDirq             ;test for ca2 IRQ (LCID display)
          beq      Txfirq               ;not LCID refresh
          jsr      DspIrq               ;service LCID display firq
*** Timer FIRQ (MC6840)
Txfirq    lda      TmrStt               ;check whitch IRQed
          bpl      6$                   ;not Timer, EXIT firq poll
          anda     #7
          lsra                          ;shift Timer#1 to carry
          bcc      4$                   ;not Timer#1
          jsr      T1urr                ; else DUMMY InitCnt irq
4$        lsra                          ;shift Timer#2 to carry
          bcc      5$                   ;not Timer#2
```

```
            jsr     TOSirq          ; else OverSpeed irq
5$          lsra                    ; shift Timer#3 to carry
            bcc     6$              ; not Timer#3 irq
            bsr     IDGate          ; ID-Verify-Gate irq, B(return)=? but that's ok
6$          puls    a,b,x
            rti
            page
*
*** ACIA interrupts
irqPol      lda     OprCtl
            bita    #Op_ACIA
            beq     irq2            ; no ACIA installed
            bita    #Op_SIon
            beq     irq2            ; ACIA is not active
            lda     ACIAsr          ; get ACIA Status register
            bpl     irq2            ; not ACIA interrupt
            jsr     ACIAIRQ         ; else go service ACIA IRQ
*** VIA#2 interrupts
irq2        lda     ifr7            ; via#7 irq pole
            bpl     irqExt          ; not via#7 irq
            anda    ier7            ; mask for enabled interrupts
            bita    #NCA1flg
            bne     NetIRQ          ; network CA1 hand-shake irq
            bita    #NT2flg
            bne     NT2IRQ          ; network T2 time-out irq
            bita    #NIDsbl
            bne     NDsIRQ          ; network Disable irq
            sta     ifr7            ; else clear all other irq flags
irqExt      rti
```

*********************************************************************

Routine that calculates the actual speed from the tach information:

*********************************************************************

; Speed is not zero. Set up appropriate flags, then convert tach data to
; speed

```
spdct110
            andb    #0xFF-ZSPEED    ; clear zero speed flag
            stab    Cstat+1
            bita    #TDAT_RDY       ; is tach data ready?
            bne     spdct114        ; br if ready
            jmp     spdct120        ; else, skip rpm and accel calculation
```

; Calculate total E counts between starting and ending tach period
; edges. This count is found from the total number of timer overflows
; (X 65536) and the initial and final values of the internal counter
; at the starting and ending tach edges, and the number of edges that
; have been output to the tach divider circuit.

; The calculation of speed involves counting a number of tach edges,
; then dividing by the time between the first and last edge. The time
; is measured in units of processor 'E' cycles because E drives the
; internal 16 bit up counter that is latched in the ICR at each rising
; edge.

$$RPM = \frac{meas\ perd}{E\ cycles} \times \frac{edges}{meas\ perd} \times \frac{revs}{edge} \times \frac{E\ cycles}{min}$$

spdct114

; Find number of E cycles elapsed between tach interrupts

```
            ldaa    Tend_cnt        ; find TOF counts ( = 65536 E cycles)
            suba    Tstrt_cnt
```

```
        staa    Fpr1+1          ;develop time of period in fpr0
        ldd     Tend_cnt+1      ;get final ICR value
        subd    Tstrt_cnt+1     ;subtract initial ICR value
        std     Fpr1+2
        bcc     spdct113        ;br if no borrow
        dec     Fpr1+1          ;else, decr TOF count
spdct113

; Convert 3 byte binary E cycle count to floating point ldx     #Fpr1
        jsr     bin2fp ; Move conversion constant into fpr0. This constant is ;               perd       E cycles
;               ----   X   --------
;               revs         min
        ldx     #Fpr0
        ldd     #Rpm_const
        jsr     cpyfpr ; Convert period in units of processor 'E' cycles to frequency in
; units of rpm.

ldd     #Fpr1           ;find rpm: rpm = (constant*edges)/period
        jsr     fdiv ;               --- Bug catcher ---
;
        tst     1,x             ;is result negative?
        bpl     _1              ;br if not
        nop
        jsr     clrfpr          ;else, speed = 0
        nop _1      ldd     #Fpr0           ;update speed
        ldx     #Rpm
        jsr     cpyfpr
```

********************************************************************* routine that checks to see if speed is within acceptable limits:

*********************************************************************

```
; func17- run sc_func17
        ldx     #Fpr0           ;is speed > 256 RPM over setpoint?
        ldd     #Setspd         ;get set speed
        jsr     cpyfpr
        ldd     #Rpm            ;subtract speed
        jsr     fsub
        ldaa    0,x             ;is difference fractional? test expon of diff
        bmi     _171            ;br if it is
        cmpa    #9              ;>= 256?
        bcs     _171            ;br if ok ; Overspeed- kill power and go to lockout jsr     sc_func24
```

```
************************************************** routine that disables the drive if overspeed has been detected:

************************************************** se_func24 ldaa    DRVCTL              ;remove rail and bridge enables
        oraa    #RAIL_ENBL+FWD_REV+DRVEN
        anda    #0xff-BRAKE_ENBL    ;apply brake enable        — 116
        staa    DRVCTL                                                    114
        ldd     #0                  ;remove drive pwm from rail and bridge
        jsr     wr_refpwm
        ldd     #0
        jsr     wr_railpwm
        ldd     #1024               ;full brake
        jsr     wr_brkpwm
        ldx     #Setspd             ;set speed = 0
        jsr     clrfpr
        ldaa    #9                  ;go to brake state
        staa    Sstate
        rts
```

What is claimed is:

1. In a control system for a centrifuge instrument having a motor with a shaft and a source of energy for the motor, the motor being operative to rotate the shaft to a rotational speed, a tachometer operative to generate a signal representative of the actual rotational speed of the shaft, the system including programmable controller means for providing a predetermined set of instrument control functions including the function of conditionally coupling the source to the motor, wherein the improvement comprises:

the programmable controller means having a first and a second processor therein, the processors being configured in a master-slave relationship for some predetermined subset of the instrument control functions during the execution of which the slave operates under the direction of the master to effect that subset of control functions, each of the processors being independently responsive to the speed signal from the tachometer and each comprising means for independently controlling the function of conditionally coupling the source to the motor.

* * * * *